(12) United States Patent
Peterson et al.

(10) Patent No.: US 10,606,003 B2
(45) Date of Patent: Mar. 31, 2020

(54) METHOD AND SYSTEM FOR AN OPTICAL COUPLER FOR SILICON PHOTONICS DEVICES

(71) Applicant: Luxtera, Inc., Carlsbad, CA (US)

(72) Inventors: Mark Peterson, San Diego, CA (US); Brian Welch, San Diego, CA (US); Steffen Gloeckner, San Diego, CA (US); Peter DeDobbelaere, San Diego, CA (US); Michael Mack, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 55 days.

(21) Appl. No.: 14/448,473

(22) Filed: Jul. 31, 2014

(65) Prior Publication Data
US 2015/0037044 A1    Feb. 5, 2015

Related U.S. Application Data

(60) Provisional application No. 61/958,666, filed on Aug. 2, 2013.

(51) Int. Cl.
*G02B 6/43* (2006.01)
*G02B 6/42* (2006.01)

(52) U.S. Cl.
CPC .............. *G02B 6/43* (2013.01); *G02B 6/4246* (2013.01); *G02B 6/4292* (2013.01); *G02B 6/428* (2013.01); *G02B 6/4214* (2013.01)

(58) Field of Classification Search
CPC .... G02B 6/428; G02B 6/4214; G02B 6/4292; G02B 6/4246
See application file for complete search history.

(56) References Cited

U.S. PATENT DOCUMENTS

| | | | | |
|---|---|---|---|---|
| 5,790,733 A | * | 8/1998 | Smith ................. | G02B 6/4249 385/59 |
| 7,665,911 B2 | * | 2/2010 | Hamazaki ............. | G02B 6/421 385/14 |
| 2009/0022500 A1 | * | 1/2009 | Pinguet ............... | G02B 6/1228 398/164 |
| 2011/0110673 A1 | * | 5/2011 | Elberbaum .......... | G02B 6/3817 398/202 |
| 2012/0263415 A1 | * | 10/2012 | Tan ......................... | G02B 6/43 385/33 |

FOREIGN PATENT DOCUMENTS

WO    WO 2013101184 A1 *  7/2013  ............... G02B 6/12

* cited by examiner

*Primary Examiner* — Sung H Pak
*Assistant Examiner* — Hoang Q Tran
(74) *Attorney, Agent, or Firm* — McAndrews, Held & Malloy, Ltd.

(57) ABSTRACT

Methods and systems for an optical coupler for photonics devices are disclosed and may include a photonics transceiver comprising a silicon photonics die, an optical source module, and a fiber connector for receiving optical fibers and including a die coupler and an optical coupling element. The die coupler may be bonded to a top surface of the photonics die and aligned above an array of grating couplers. The optical coupling element may be attached to the die coupler and the electronics die and the source module may be bonded to the top surface of the photonics die. A continuous wave (CW) optical signal may be received in the photonics die from the optical source module. Modulated optical signals may be received in the photonics die from optical fibers coupled to the fiber connector.

25 Claims, 15 Drawing Sheets

METHOD AND SYSTEM FOR AN OPTICAL COUPLER FOR SILICON PHOTONICS DEVICES

CROSS-REFERENCE TO RELATED APPLICATIONS/INCORPORATION BY REFERENCE

This application makes reference to, claims priority to, and claims the benefit of U.S. Provisional Application Ser. No. 61/958,666 filed on Aug. 2, 2013. This application also makes reference to U.S. Provisional Application 61/743,233 filed on Aug. 29, 2012.

Each of the above cited references is hereby incorporated by reference in its entirety.

FIELD

Certain embodiments of the disclosure relate to semiconductor processing. More specifically, certain embodiments of the disclosure relate to a method and system for an optical coupler for silicon photonics devices.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for an optical coupler for silicon photonics devices, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for an optical coupler for silicon photonics devices. Example aspects of the disclosure may comprise a photonics transceiver comprising a silicon photonics die, an electronics die, an optical source module, and a fiber connector, the fiber connector for receiving one or more optical fibers and comprising a die coupler and an optical coupling element. The die coupler may be bonded to a top surface of the photonics die and aligned above an array of grating couplers, where the optical coupling element may be removably attached to the die coupler and where the electronics die and the optical source module may be bonded to the top surface of the silicon photonics die. One or more continuous wave (CW) optical signals may be received in the silicon photonics die from the optical source module and the one or more received CW optical signals may be processed based on electrical signals received from the electronics die. Modulated optical signals may be received in the silicon photonics die from one or more optical fibers coupled to the fiber connector. The optical coupling element may redirect the received modulated optical signals at a near right angle to the top surface of the photonics die. Electrical signals may be generated in the silicon photonics die based on the received modulated optical signals, and may be communicated to the electronics die. The modulated optical signals may be received via grating couplers in the top surface of the photonics die. The optical coupling element may comprise an array of lenses, one or more guide holes for receiving the one or more optical fibers, a prism reflector and/or an array of optical fibers bent at a near right angle. The array of optical fibers in the optical coupling element may comprise multi-core fibers. The die coupler may comprise an array of fiber stubs, and/or an array of lenses. The one or more optical fibers may comprise multi-core fibers.

Figure 1:
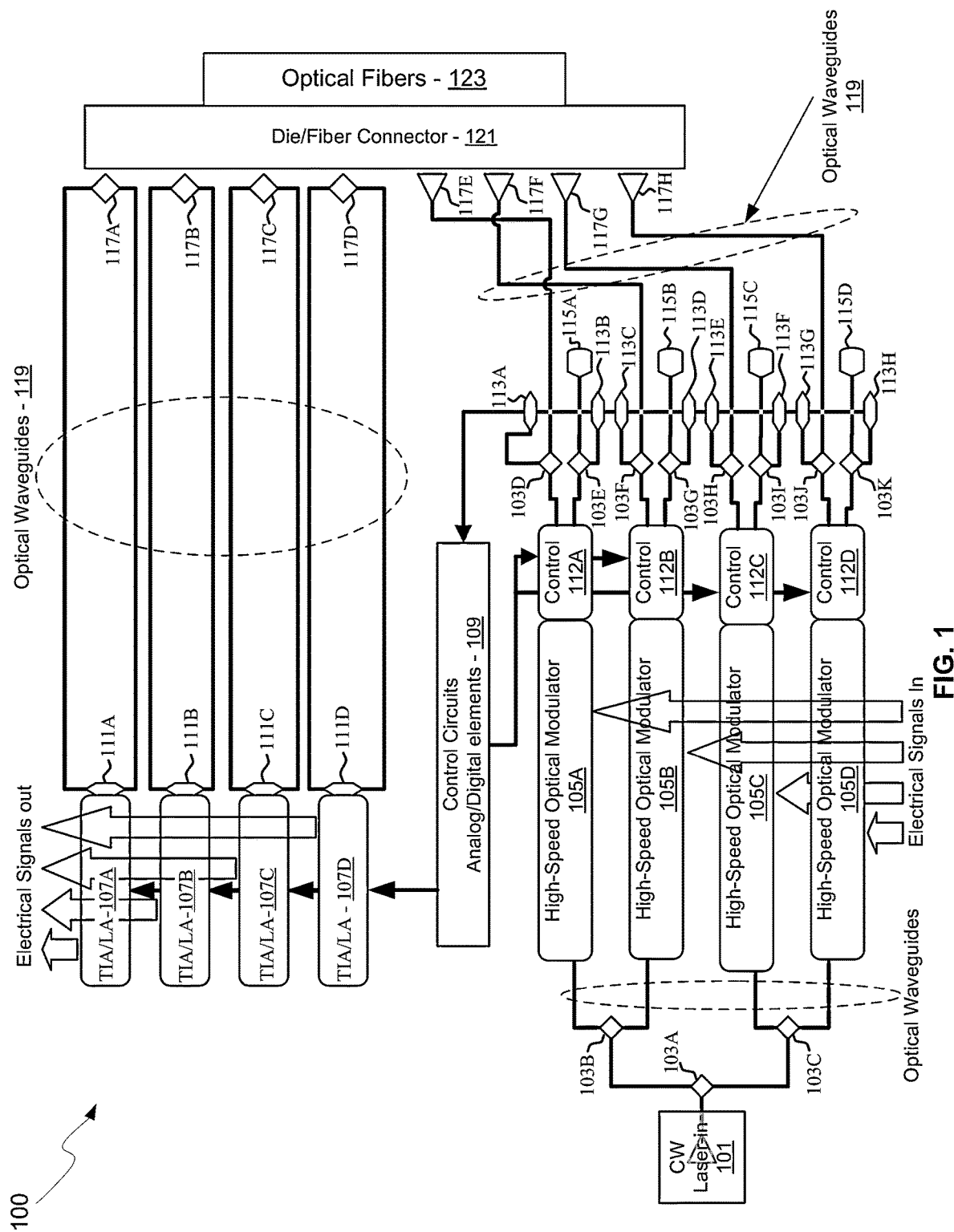
FIG. 1 is a block diagram of a photonic transceiver, in accordance with an example embodiment of the disclosure.

FIG. 1 is a block diagram of a photonic transceiver, in accordance with an example embodiment of the disclosure. Referring to FIG. 1, there is shown optoelectronic devices in a transceiver 100 comprising high speed optical modulators 105A-105D, high-speed photodiodes 111A-111D, monitor photodiodes 113A-113H, and optical devices comprising taps 103A-103K, optical terminations 115A-115D, and grating couplers 117A-117H. There are also shown electrical devices and circuits comprising transimpedance and limiting amplifiers (TIA/LAs) 107A-107D, analog and digital control circuits 109, and control sections 112A-112D. Optical signals are communicated between optical and optoelectronic devices via optical waveguides 119 fabricated in a photonics chip.

The photonic transceiver 100 may be integrated on one or more optical chips and one or more electronics chips. Accordingly, optical and optoelectronic devices may be integrated on one or more photonics die and the electronics devices, such as the transimpedance and limiting amplifiers (TIA/LAs) 107A-107D, analog and digital control circuits 109, and control sections 112A-112D, may be integrated on one or more electronics die. In this manner, different CMOS nodes may be optimized for fabricating optical devices as compared to nodes utilized to fabricate electronic devices.

The high speed optical modulators 105A-105D may comprise Mach-Zehnder or ring modulators, for example, and enable the modulation of the CW laser input signal. The high speed optical modulators 105A-105D may be controlled by the control sections 112A-112D, and the outputs of the modulators may be optically coupled via waveguides to the grating couplers 117E-117H. Example modulation techniques comprise amplitude shift keying (ASK), binary phase shift keying (BPSK), pulse amplitude modulation (PAM), quadrature amplitude modulation (QAM), quadrature phase shift keying (QPSK), and dual polarization quadrature phase shift keying (DP-QPSK). The taps 103D-103K may comprise four-port optical couplers, for example, and may be utilized to sample the optical signals generated by the high speed optical modulators 105A-105D, with the sampled signals being measured by the monitor photodiodes 113A-113H. The unused branches of the taps 103D-103K may be terminated by optical terminations 115A-115D to avoid back reflections of unwanted signals.

The grating couplers 117A-117H comprise optical gratings that enable coupling of light into and out of the chip. The grating couplers 117A-117D are utilized to couple light received from optical fibers into the chip, and may comprise polarization independent grating couplers. The grating couplers 117E-117H may be utilized to couple light from the chip into optical fibers 123 via the die/fiber connector 121. The die/fiber connector 121 may be placed on a photonics die by active, passive, or vision-based alignment. The die/fiber connector 121 may receive optical signals from the grating couplers 117E-117H and guide the signals to a single or multicore fiber, illustrated by the optical fibers 123.

The die/fiber connector 121 may be coupled to a photonics die without optical fibers permanently attached to the coupler, i.e., the fibers that lead away from the die may be removably attached to the die/fiber connector 121, which may itself comprise fiber stubs coupled to the die. On the fiber side of the optical coupler 121, optical coupling may be made to single or multi-mode fibers with mechanical coupling, such as with a uniferrule, or non-mechanical coupling, utilizing an expanded beam lens system, for example. Mechanical coupling may comprise physical contact or close proximity coupling, where proximity coupling may comprise index matching material and/or anti-reflection coating to reduce reflection and loss. The die/fiber connector 121 may comprise a built-in approximately 90 degree turn of the optical path allowing low-profile packaging of silicon photonics devices, although any angle turn may be utilized depending on packaging requirements. Because the die/fiber connector 121 may be aligned and fixed on the silicon photonics die without fibers permanently attached, this may enable wafer-scale optical interface assembly for large improvement in cycle time, process control, and automation.

The high-speed photodiodes 111A-111D may convert optical signals received from the grating couplers 117A-117D into electrical signals that may be communicated to the TIA/LAs 107A-107D for processing. The analog and digital control circuits 109 may control gain levels or other parameters in the operation of the TIA/LAs 107A-107D. The TIA/LAs 107A-107D, the analog and digital control circuits 109, and the control sections 112A-112D may be integrated on an electronics chip that may be bonded to the silicon photonics chip via metal interconnects. In an example scenario, the metal interconnects may comprise copper pillars. In this manner, electronic and photonic performance may be optimized independently on different fabrication technology platforms. In an example scenario, the electronics die may comprise CMOS die, but the disclosure is not so limited. Accordingly, any semiconductor technology may be utilized to fabricate the electronic die, such as CMOS, Bi-COMS, SiGe, or III-V processes. The TIA/LAs 107A-107D may then communicate electrical signals to other circuitry on the electronics chip.

The control sections 112A-112D may comprise electronic circuitry that enables modulation of the CW laser signal received from the taps 103A-103C. The high speed optical modulators 105A-105D may utilize high-speed electrical signals to modulate the refractive index in respective branches of a Mach-Zehnder interferometer (MZI), for example.

In an embodiment of the disclosure, the integration of all optical and optoelectronic devices required for a transceiver into a single silicon photonics chip, and of all required electronic devices on one or more electronics chips, enables optimized performance of the resulting single hybrid package. In this manner, electronic device performance may be optimized independently of the optimization of photonic devices in the silicon photonic chip. For example, the electronics chip may be optimized on a 32 nm CMOS process, while the photonics chip may be optimized on a 130 nm CMOS node. Additionally, the electronics or photonics chips may be fabricated utilizing technologies other than CMOS, such as SiGe or bipolar-CMOS (Bi-CMOS). The electronics devices may be placed on the electronics chip such that they are located directly above their associated photonics devices when bonded to the photonics chip. For example, the control sections 112A-112D may be located on the electronics chip such that they lie directly above the high-speed optical modulators 105A-105B and can be coupled by low parasitic copper pillars.

In an example embodiment, the hybrid transceiver 100 comprises four optoelectronic transceivers with one optical source, and enables communication of optical signals vertically to and from the surface of the photonics chip, thereby enabling in an example embodiment, the use of CMOS processes and structures, including a CMOS guard ring. The photonics chip may comprise both active devices, such as photodetectors and modulators, and passive devices, such as waveguides, splitters, combiners, and grating couplers, thereby enabling photonic circuits to be integrated on silicon chips.

In an example scenario, the die/fiber connector 121 may enable full wafer-scale assembly with wafer-scale die-to-wafer bonds, such as electronics die, light assemblies, and optical connectors being bonded to a photonics wafer. The die/fiber connector 121 may also enable low-profile interconnects to photonics die where the fiber or fibers are parallel to the surface of the die. Conventionally, this may be implemented with a mirror structure, but in an example embodiment of the disclosure, this may be implemented with an array of multi-core fibers bent over approximately 90 degrees. As stated above, the approximately 90 degree bend is an example embodiment, as any angle may be utilized depending on packaging needs and space requirements. The bent fibers may be molded in a plastic matrix, with the perpendicular end faces polished similar to an MT-ferrule. In this case, only the interfaces need precise alignment, which would be done at wafer level to each of the die and with a ferrule connector, for example. The only other loss contribution would be bending loss of the fiber in the die/fiber connector 121, which may have an optical path of less than 1 cm. Optical losses may be reduced and/or minimized through the use of alignment features at the fiber side of the die/fiber connector 121, allowing a simple passive mechanical/non-mechanical connection between the die/fiber connector 121 and the optical fibers 123.

Figure 2:
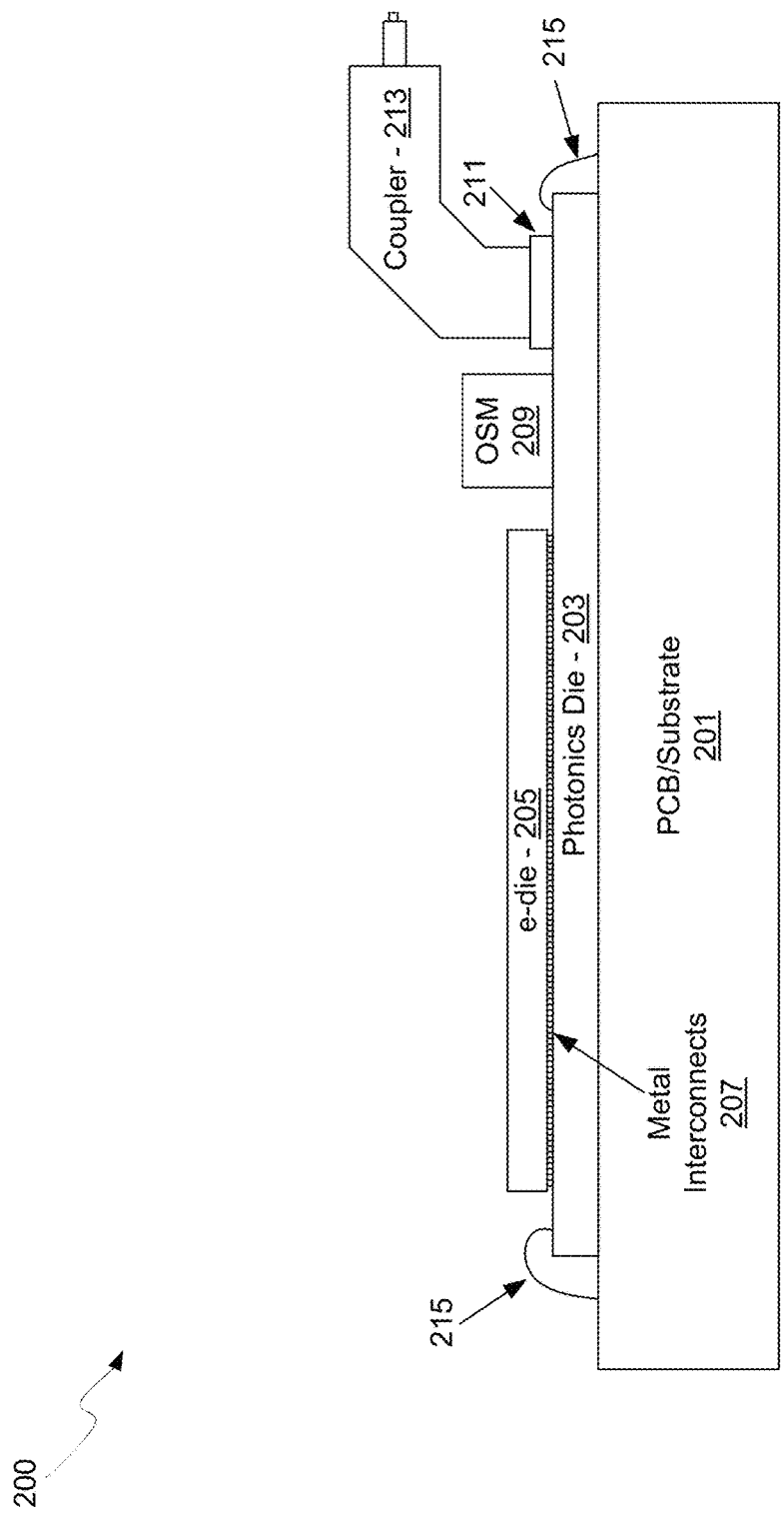
FIG. 2 is a schematic illustrating an example hybrid integration photonic transceiver, in accordance with an embodiment of the disclosure

FIG. 2 is a schematic illustrating an example hybrid integration photonic transceiver, in accordance with an embodiment of the disclosure. Referring to FIG. 2, there is shown a hybrid integration photonic transceiver 200 comprising a printed circuit board (PCB)/substrate 201, a photonic CMOS die 203, an electronic CMOS die 205, metal interconnects 207, an optical source module 209, a die coupling module 211, an optical coupling element 213, and wire bonds 215.

The PCB/substrate 201 may comprise a support structure for the transceiver 200, and may comprise both insulating and conductive material for isolating devices as well as providing electrical contact for active devices on the photonics die 203 as well as to devices on the electronics die 205 via the photonics die 203. In addition, the PCB/substrate may provide a thermally conductive path to carry away heat generated by devices and circuits in the electronics die 205 and the optical source module 209.

The photonics die 203, which may also be referred to as an optical or photonics interposer, may comprise a silicon chip with active and passive optical devices such as waveguides, modulators, photodetectors, grating couplers, taps, and combiners, for example. The photonics die 203 may also comprise metal interconnects 207 for coupling the electronics die 205 to the photonics die 203, as well as grating couplers for coupling light into the die from the optical source module 209 and into/out of the die via the die coupling module 211 and optical coupling element 213. In addition, the photonics die 203 may comprise through-substrate-vias (TSVs), not shown, for electrical interconnection through the die, such as between the PCB/substrate 201 and the electronics die 205.

The electronics die 205 may comprise a chip that provides the required electronic functions of the photonic transceiver 200. The electronics die 205 may comprise a single chip or a plurality of die coupled to the photonics chip 203 via the metal interconnects 207. The electronics die 205 may comprise TIA's, LNAs, and control circuits for processing optical signals in the photonics chip 203. For example, the electronics die 205 may comprise driver circuitry for controlling optical modulators in the photonics die 203 and variable gain amplifiers for amplifying electrical signals received from photodetectors in the photonics die 203. By incorporating photonics devices in the photonics die 203 and electronic devices in the electronics die 205, the processes for each chip may be optimized for the type of devices incorporated.

The metal interconnects 207 may comprise linear or 2D arrays of metal pillars, for example, to provide electrical contact between the photonics die 203 and the electronics die 205. In an example scenario, the metal interconnects 207 may comprise copper pillars, or any other suitable metal for semiconductor contacts, such as stud bumps or solder bumps. Accordingly, the metal interconnects 207 may provide electrical contact between photodetectors in the photonics die 203 and associated receiver circuitry in the electronics die 205. In addition, the metal interconnects 207 may provide mechanical coupling of the electronics and photonics die, and may be encapsulated with underfill to protect the metal and other surfaces.

The optical source module 209 may comprise an assembly with an optical source, such as one or more semiconductor lasers, and associated optical elements to direct one or more optical signals into the photonics die 203. An example of the optical source module is described in U.S. patent application Ser. No. 12/500,465 filed on Jul. 9, 2009, which is hereby incorporated in its entirety. In another example scenario, the optical signal or signals from the optical source assembly 209 may be coupled into the photonics die 203 via optical fibers affixed above grating couplers in the photonics die 203. In yet another example scenario, the optical source module 209 may be external to the photonic transceiver 200 and one or more optical source signals may be provided through the optical coupling element 213 and the die coupling module 211.

The die coupling module 211 may comprise an assembly for coupling optical signals from the optical coupling element 213 to optical couplers, such as grating couplers, in the photonics die 203. Accordingly, in an example embodiment, the die coupling module 211 may comprise an array of lenses in a molded piece of optically transparent material with mating posts or holes, which may enable a mating connection with the optical coupling element 213. In another example scenario, the die coupling module may comprise an array of fiber stubs embedded in an epoxy material or other matrix material, for example, with the stubs providing optical coupling from the optical coupling element 213 to grating couplers in the photonics die 203.

The optical coupling element 213 may be coupled to the photonics die 203 without optical fibers permanently attached to the coupler. On the fiber side of the optical coupling element 213, illustrated by the posts extending from the vertical surface of the optical coupling element 213, optical coupling may be made to single or multi-mode fibers with mechanical coupling, such as with a uniferrule, or non-mechanical coupling, utilizing an expanded beam lens system, for example. In another example embodiment, the optical coupling element 213 may comprise reflective surfaces formed within the coupling element for directing light at right angles from a received direction.

As shown, the optical coupling element 213 comprises a built-in 90 degree turn of the optical path allowing low-profile packaging of silicon photonics devices in the photonics transceiver 200. Because the optical coupling element 213 may be aligned and fixed on the silicon photonics die 203 without fibers permanently attached, this may enable wafer-scale optical interface assembly for large improvement in cycle time, process control, and automation.

In an example scenario, the optical coupling element 213 may enable full wafer-scale assembly with wafer-scale die-to-wafer bonds, such as the electronics die 205, the optical source assembly 209, and optical connectors being bonded to a wafer comprising the photonics die 203. The optical coupling element 213 may also enable low-profile interconnects to the photonics die 203 where the fiber or fibers are parallel to the surface of the die. Conventionally, this may be implemented with a mirror structure, but in an example embodiment of the disclosure, this may be implemented with an array of multi-core fibers bent over 90 degrees. The bent fibers may be molded in a plastic matrix, with the perpendicular end faces polished similar to an MT-ferrule. In this case, only the interfaces need precise alignment, which would be done at wafer level to each of the die and with a ferrule connector, for example.

While a single optical coupling element is shown in FIG. 2 for figure clarity, the disclosure is not so limited. Accordingly, multiple optical coupling elements may be arranged across one or more edges of the photonics die 203. In an example scenario, a pair of optical coupling elements may be arranged on opposite edges of the photonics die 203, as shown in FIG. 4. It should be noted that the optical coupling elements are not limited to the edges of the photonics die 203, and may be bonded anywhere space allows.

In operation, continuous-wave (CW) optical signals may be communicated into the photonics die 203 from the optical source module 209 via one or more grating couplers in the photonics die 203. Photonic devices in the photonics die 203 may then process the received optical signal. For example, one or more optical modulators may modulate the CW signal based on electrical signals received from the electronics die 205. Electrical signals may be received from the electronics die 205 via the metal interconnects 207. By integrating modulators in the photonics die 203 directly beneath the source of the electrical signals in the electronics die 205, signal path lengths may be minimized, resulting in very high speed performance. For example, utilizing metal pillars with <20 fF capacitance, speeds of 50 GHz and higher can be achieved.

The modulated optical signals may then be communicated out of the photonics die 203 via grating couplers situated beneath the die coupling module 211. In this manner, high-speed electrical signals generated in the electronics die 205 may be utilized to modulate a CW optical signal and subsequently communicated out of the photonics die 203 via optical fibers coupled to the optical coupling element 213.

Similarly, modulated optical signals may be received in the photonics die 203 via optical fibers coupled to the optical coupling element 213. The received optical signals may be communicated within the photonics die 203 via optical waveguides to one or more photodetectors integrated in the photonics die 203. The photodetectors may be integrated in the photonics die 203 such that they lie directly beneath the associated receiver electronics circuitry in the electronics die 205 when bonded and electrically coupled by the low parasitic capacitance metal interconnects 207.

The hybrid integration of electronics die on photonic die via metal interconnects enables very high speed optical transceivers utilizing standard semiconductor processes, such as CMOS, Bi-CMOS, or Si—Ge. In addition, integrating separate photonic and electronic die enables the independent optimization of the performance of electronic and photonic functions within the respective semiconductor processes.

Figures 3A, 3B:
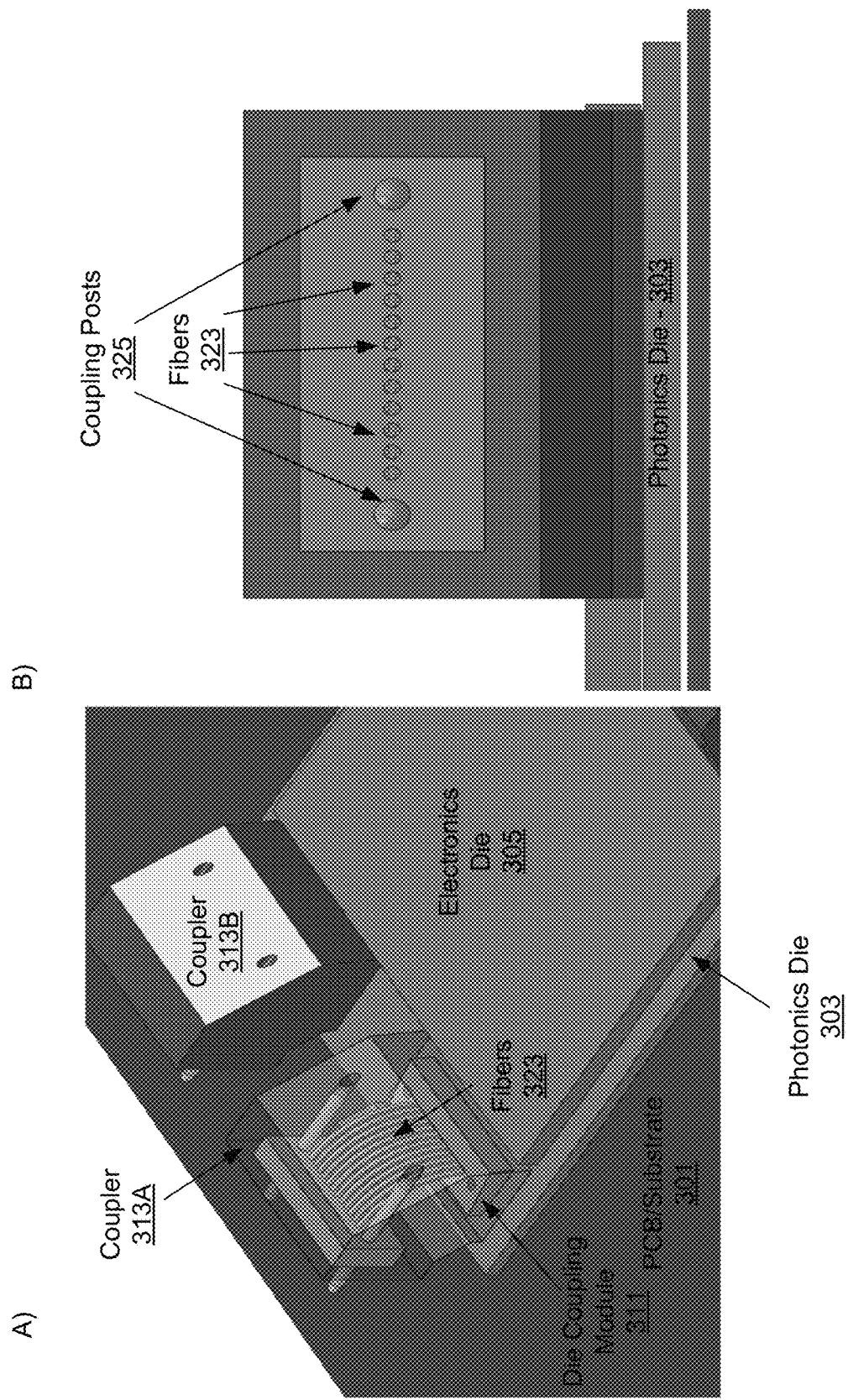
FIGS. 3A and 3B show various views of optical coupling elements on a photonics die, in accordance with an example embodiment of the disclosure.

FIGS. 3A and 3B show various views of optical coupling elements on a photonics die, in accordance with an example embodiment of the disclosure. Referring to FIG. 3A, there is shown a PCB/substrate 301, a photonics die 303, an electronics die 305, a die coupling module 311, and optical coupling elements, which may be substantially similar to the similarly named elements in FIG. 2. The coupler 313A is shown as being transparent in FIG. 3A to show the internal elements of the coupler as well as the die coupling module 311.

The optical coupling elements 313A and 313B comprise optical fibers 323 shown within the optical coupling element 313A that enable the near right angle, i.e., near 90 degree, bend of optical signals to be communicated to and from the photonics die 303. The fibers 323 may be bent and encapsulated in a plastic of similar material to the fibers 323, where the bend radius may be the tightest possible without incurring excessive bend loss so as to provide minimum height of the optical coupling elements 313. The fibers 323 may be multi-core fibers, as illustrated by the 6-core fibers shown in FIG. 3B, although single core fibers may also be used. Similarly, single-mode and/or multi-mode fibers may be utilized, depending on the devices to be coupled to the optical coupling elements 313.

The die coupling module 311 may comprise an assembly for coupling optical signals from the optical coupling element 313A to optical couplers, such as grating couplers, in the photonics die 303. Accordingly, the die coupling module 311 may comprise an array of lenses in a molded piece of optically transparent material with mating posts or holes, thereby enabling a mating connection with the optical coupling element 313A. In another example scenario, the die coupling module 311 may comprise an array of fiber stubs embedded in an epoxy material, for example, with the stubs providing optical coupling from the optical coupling element 313A to grating couplers in the photonics die 303.

FIG. 3B shows an end view of the optical coupling elements 313A/313B, showing coupling posts 325 and the ends of the fibers 323. The coupling posts 325 may comprise alignment structures that enable the accurate connection of fibers with a ferrule or plug connector for coupling to the optical coupling elements 313. In an example scenario, the optical coupling elements 313 may provide an MT-ferrule connector for simple and automatically aligned interconnects to photonics transceivers in the photonics die 303 and the electronics die 305. The ends of the fibers 323 may be polished to match components in an MT-ferrule for low-loss coupling to a fiber bundle/array.

The optical coupling elements 313 therefore provide a low-profile optical interconnect between a multi-channel surface-emitting and/or receiving device, such as the photonics die 303, and a multi-core fiber array, such as via an MT-ferrule. Advantages of this structure include simplicity of construction and low coupling loss compared with other surface emitting/receiving coupling schemes. The fibers 323 may be utilized to configure the spatial and rotational alignment of the input/output fiber array coupled to the optical coupling elements 313. It should be noted that the optical coupling elements are not limited to the edges of the photonics die 303 nor are they limited to approximately 90 degrees, and may be bonded anywhere space allows on the die and at any angle allowed by packaging or other requirements.

As shown in FIG. 3A, more than one optical coupling element may be situated on the photonics die 303, although the disclosure is not so limited. Accordingly, any number of optical coupling elements may be provided on one or more edges of the photonics die, depending on chip space and desired I/O access to the package.

Figures 4A, 4B:
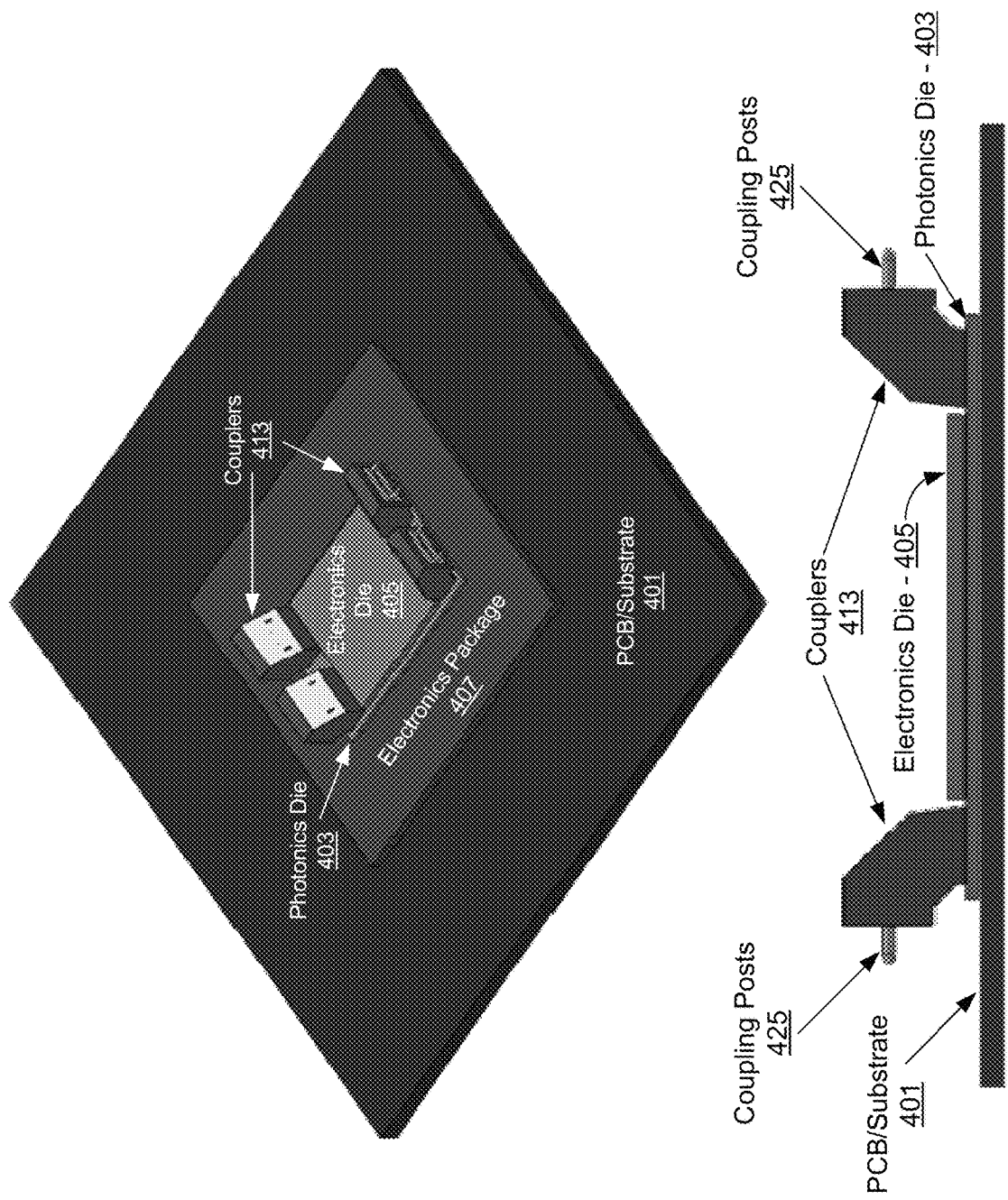
FIGS. 4A and 4B show oblique and side views of multiple optical coupling elements on a photonics die, in accordance with an example embodiment of the disclosure.

FIGS. 4A and 4B show oblique and side views of multiple optical coupling elements on a photonics die, in accordance with an example embodiment of the disclosure. Referring to FIG. 4A, there is shown a PCB/substrate 401, a photonics die 403, and electronics die 405, an electronics package 407, and optical coupling elements 413. The electronics package 407 may comprise a mechanical support for the photonics die 403, the electronics die 405, and the optical coupling elements 413 and may comprise a smaller support structure than the PCB/substrate 401, which may support a larger system that utilizes photonic transceivers in the photonics die 403 and the electronics die 405. In addition, the electronics package 407 may comprise conducting and insulating layers for providing electrical contact to the photonics die 403, the electronics die 405, and the PCB/substrate 401.

The optical coupling elements 413 may comprise coupling posts 425 for MT-ferrule connections, for example, and may be mated to a die coupling assembly on the photonics die 403, such as the die coupling module 311 in FIG. 3, at the opposite end of the coupling element. In this manner, a plurality of arrays of multi-core fibers may be coupled to the one or more photonics transceivers in the photonics die 403 and the electronics die 405.

Figure 5:
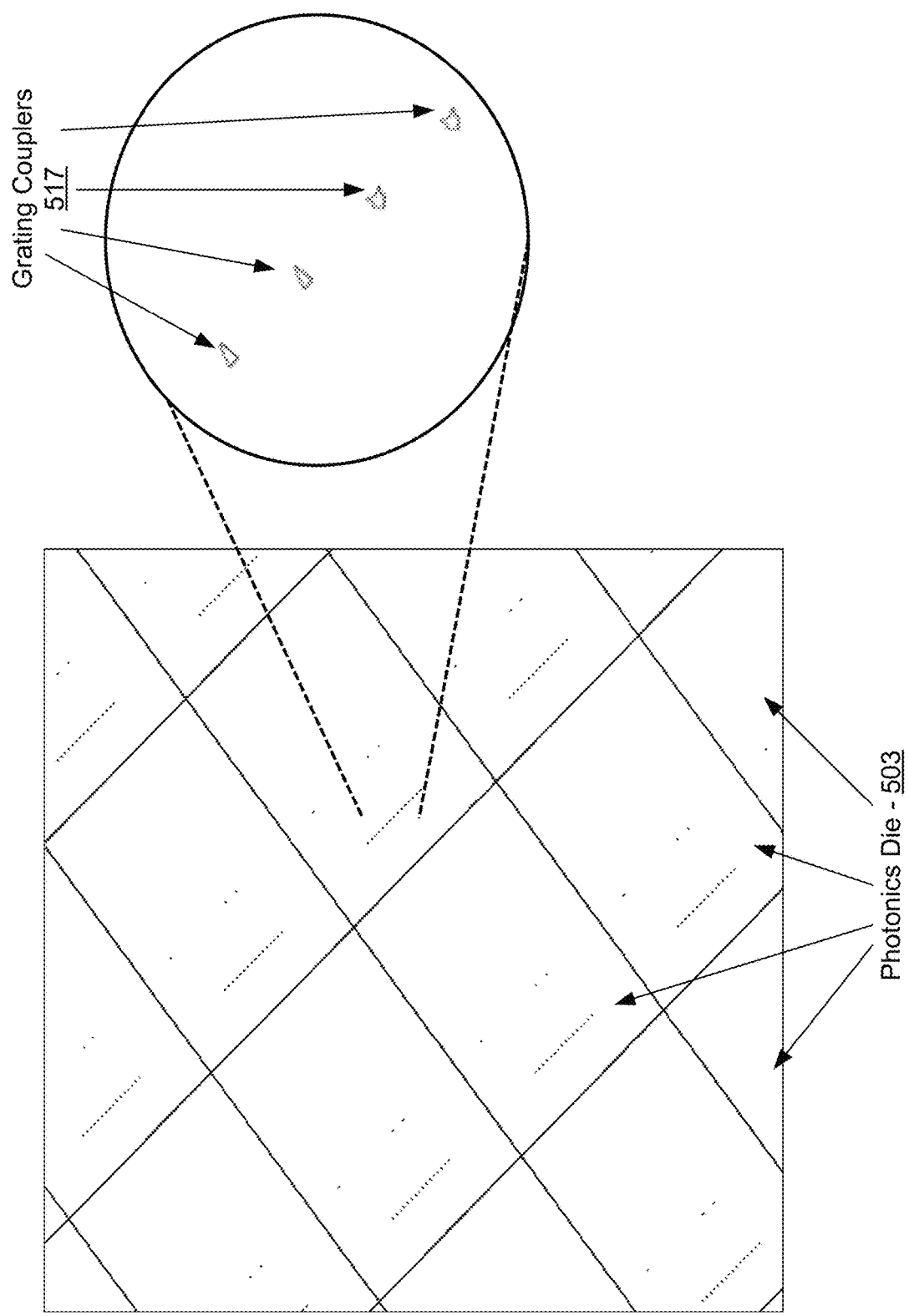
FIG. 5 is a drawing illustrating a plurality of photonics die with grating couplers, in accordance with an example embodiment of the disclosure.

FIG. 5 is a drawing illustrating a plurality of photonics die with grating couplers, in accordance with an example embodiment of the disclosure. Referring to FIG. 5, there is shown a plurality of photonics die 503, each with an array of grating couplers 517. The plurality of photonics die 513 may comprise a silicon photonics wafer that may be diced into individual photonics die once the optical connectors are bonded while still in wafer form.

The grating couplers 517 may comprise gratings forming in the photonics die 513 for coupling optical signals into and out of the top surface of the die, and may comprise polarization splitting grating couplers or single polarization grating couplers, for example. The grating spacing, size, and shape, for example, may determine the spot size and location for coupling optical signals with the highest coupling efficiency. In addition, the angle at which the light signal is incident upon the top surface may also affect coupling efficiency, so an accurate and fixed coupling path ensures good optical coupling efficiency.

Figure 6:
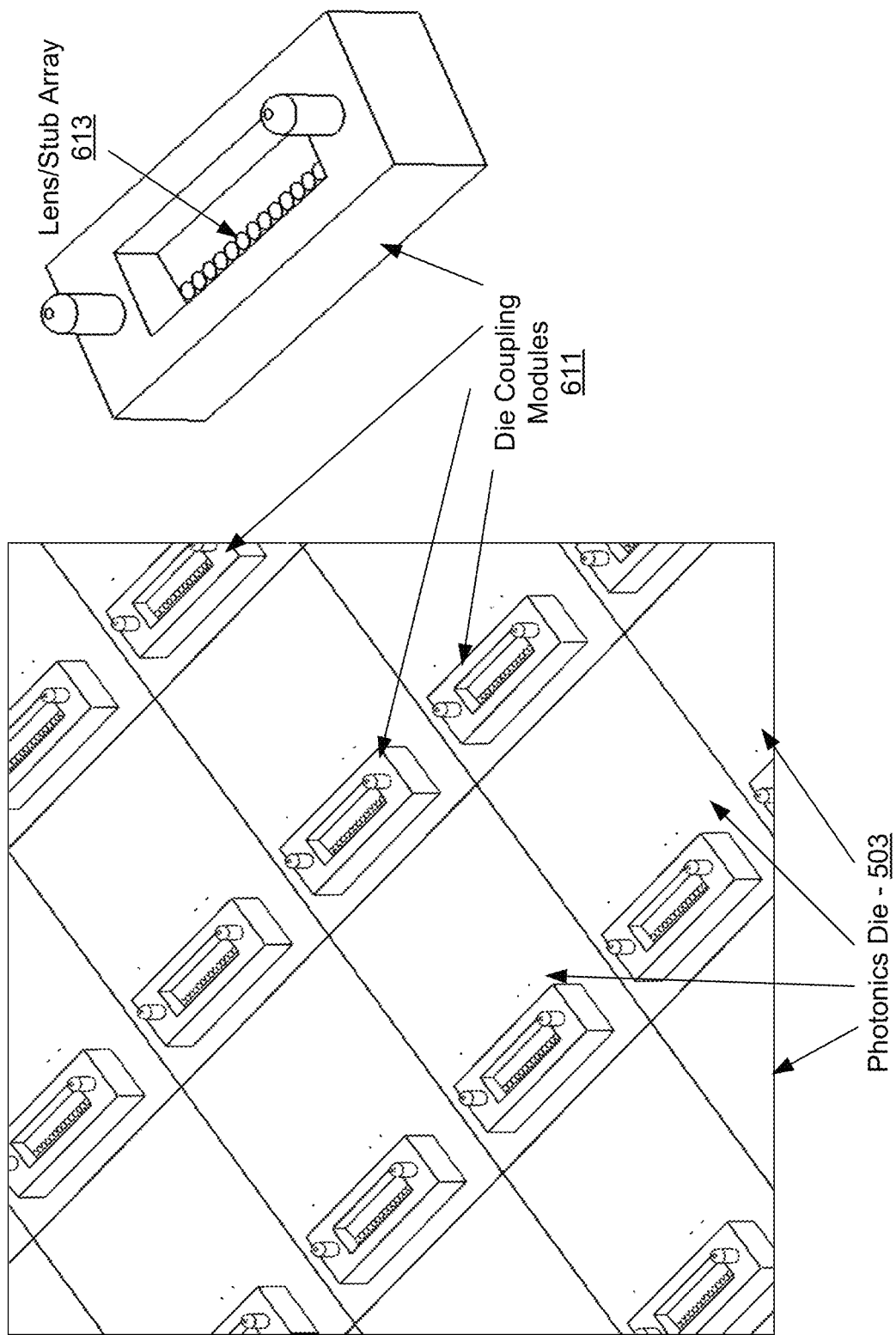
FIG. 6 is drawing illustrating die coupling modules bonded to photonics die, in accordance with an example embodiment of the disclosure.

FIG. 6 is drawing illustrating die coupling modules bonded to photonics die, in accordance with an example embodiment of the disclosure. Referring to FIG. 6, there is shown the photonics die 503 with die coupling modules 611 bonded to the top surface of the die and aligned with the grating couplers 517 shown in FIG. 5. The die coupling modules 611 may be substantially similar to the die coupling modules 311 described with respect to FIG. 3, and may provide an optical and mechanical interconnect to the photonics die 503.

In an example scenario, the die coupling modules 611 may comprise a lens/stub array 613, which may comprise a plurality of lenses or fiber stubs for providing optical coupling to the grating couplers 517 in the photonics die 503. The die coupling modules 611 may be bonded to the photonics die 503 when still in wafer form, enabling the use of fiducial features on the wafer for accurate alignment with the grating couplers 517.

Once the die coupling modules 611 are accurately aligned with the grating couplers 517, they may be affixed to the photonics die 503 utilizing epoxy, for example, thereby providing a fixed connector to a die without long fiber arrays. Because no fiber "pigtails" are involved before die separation, wafer-level processing is enabled, further improving cycle times. In addition to the die coupling modules 611, other structures may be bonded to the photonics die 503, such as light modules and electronics die, as shown further in FIGS. 10-10D.

Figure 7:
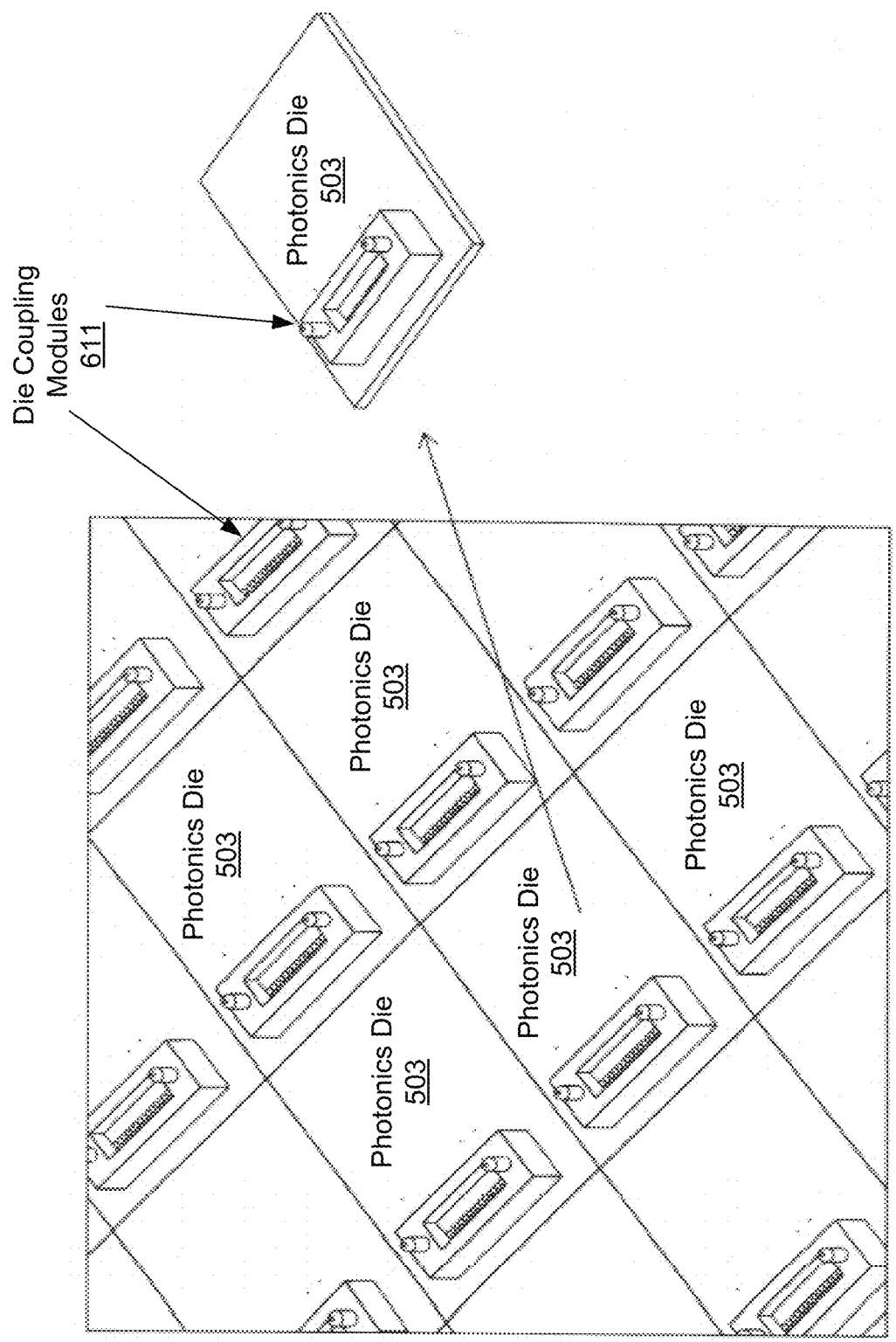
FIG. 7 is a drawing illustrating the separation of a photonics wafer into discrete photonics die, in accordance with an example embodiment of the disclosure.

FIG. 7 is a drawing illustrating the separation of a photonics wafer into discrete photonics die, in accordance with an example embodiment of the disclosure. After the die coupling modules 611 have been bonded to the photonics die 503, they may be separated utilizing a wafer dicing saw, for example, to result in a plurality of discrete photonics die 503. As stated above, other structures may also be bonded to the die, as shown in FIGS. 10-10D.

Figure 8:
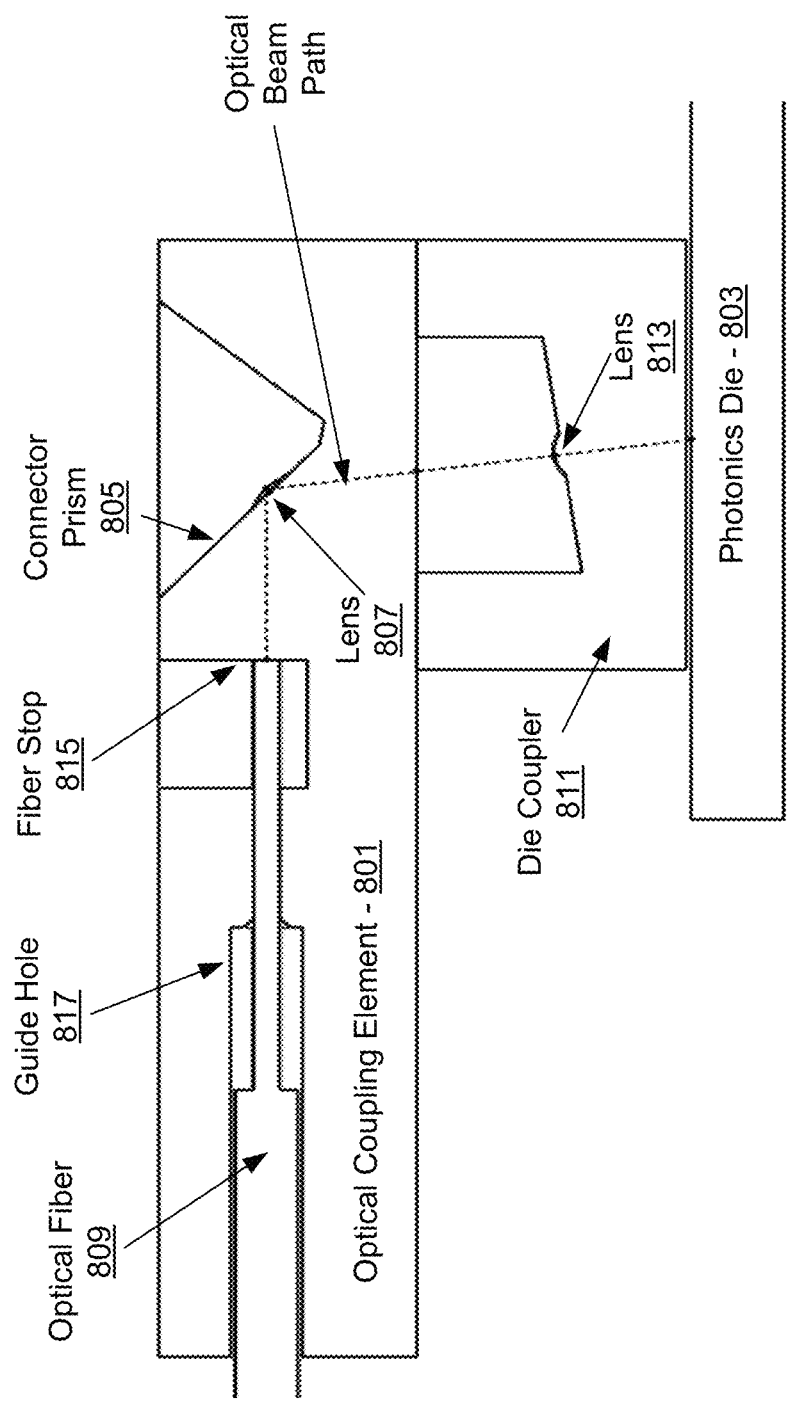
FIG. 8 is a drawing illustrating a optical coupling element, in accordance with an example embodiment of the disclosure.

FIG. 8 is a drawing illustrating an optical coupling element, in accordance with an example embodiment of the disclosure. Referring to FIG. 8, there is shown an optical coupling element 801 and a lensed coupler 811 mounted on a photonics die 803. The optical coupling element 801 may comprise a single molded piece of optically transparent material with an angled surface (prism), an array of optical lenses, features for mating to the lensed coupling element, and features for insertion, strain relief, and precision locating of stripped and cleaved optical fibers. The optical coupling element 801 and the die coupler 811 may illustrate an alternative to the bent fiber couplers shown in FIGS. 2, 3A, 3B, 4A, and 4B.

The optical coupling element 801 may comprise a mechanical support structure with one or more guide holes 817 in which optical fibers may be inserted, with a fiber stop 815 formed to define a stop point upon insertion of a fiber. In addition, the connector prism 805 may be formed in the optical coupling element 801 for redirecting optical signals downward at angles at or greater than 90 degrees from the incoming angle to result in a desired angle with respect to the surface of the photonics die 803, such that coupling efficiency is maximized.

A reflective lens 807 may be formed in the connector prism 805 to align with the optical beam path to and from the optical fiber 809. The optical coupling element 801 may be bonded to a die coupler 811, which may be bonded to the photonics die 803, and may also comprise a lens 813 for directing the beam to a grating coupler in the photonics die 803.

The optical fiber 809 may be inserted until it reaches a fiber stop 815. As shown by the optical beam path, light emitted from the end of the optical fiber 809 may be reflected by the lens 807 in the connector prism 805 and directed into the die coupler 811 and further focused to a grating coupler in the photonics die 803. Similarly, light emitted from the photonics die 803 may be focused by the lens 813 to the lens 805, where it may be reflected to the optical fiber 809.

Because FIG. 8 is a cross section of the optical coupling element and the die coupler 811, only a single fiber is shown. However, the disclosure is not so limited, and the optical fiber 809 may comprise an array of single- or multi-mode multi-core or single-core fibers. Accordingly the optical coupling element 801 may comprise an array of lenses 807 and the die coupler 811 may comprise an array of lenses 813, as shown in FIGS. 9A-9D.

Figure 9A:
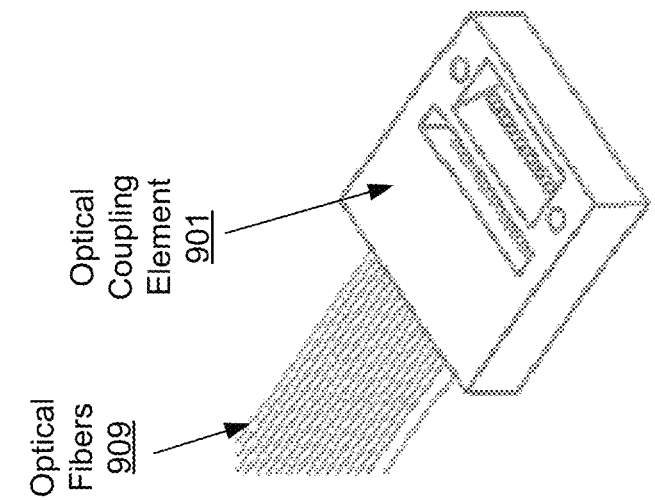
FIGS. 9A-9D illustrate the coupling of a optical coupling element to a photonics die, in accordance with an example embodiment of the disclosure.

FIGS. 9A-9D illustrate the coupling of an optical coupling element to a photonics die, in accordance with an example embodiment of the disclosure. Referring to FIG. 9A, there is shown an optical coupling element 901 that may be substantially similar to the optical coupling element 801 described in FIG. 8, and may comprise a prism 905, lenses 907, and alignment holes 915.

Figure 9B:
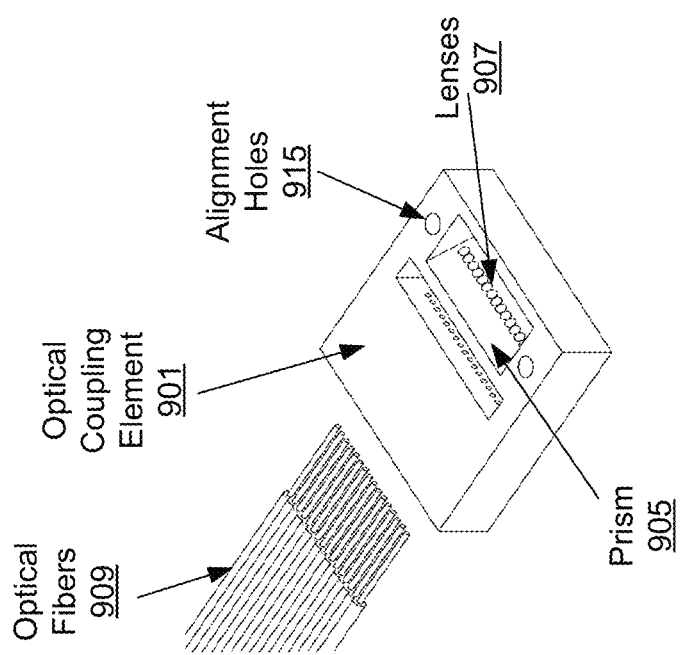

The alignment holes 915 may be utilized to align the optical coupling element 901 to another structure. In another scenario, the alignment holes may instead comprise alignment posts for inserting into alignment holes in another structure. There is also shown optical fibers 909, which may comprise an array of single- or multi-core optical fibers, shown in FIG. 9A with stripped ends before being inserted into the optical coupling element. FIG. 9B illustrates the optical fibers 909 after insertion into the optical coupling element 901.

Figures 9C, 9D:
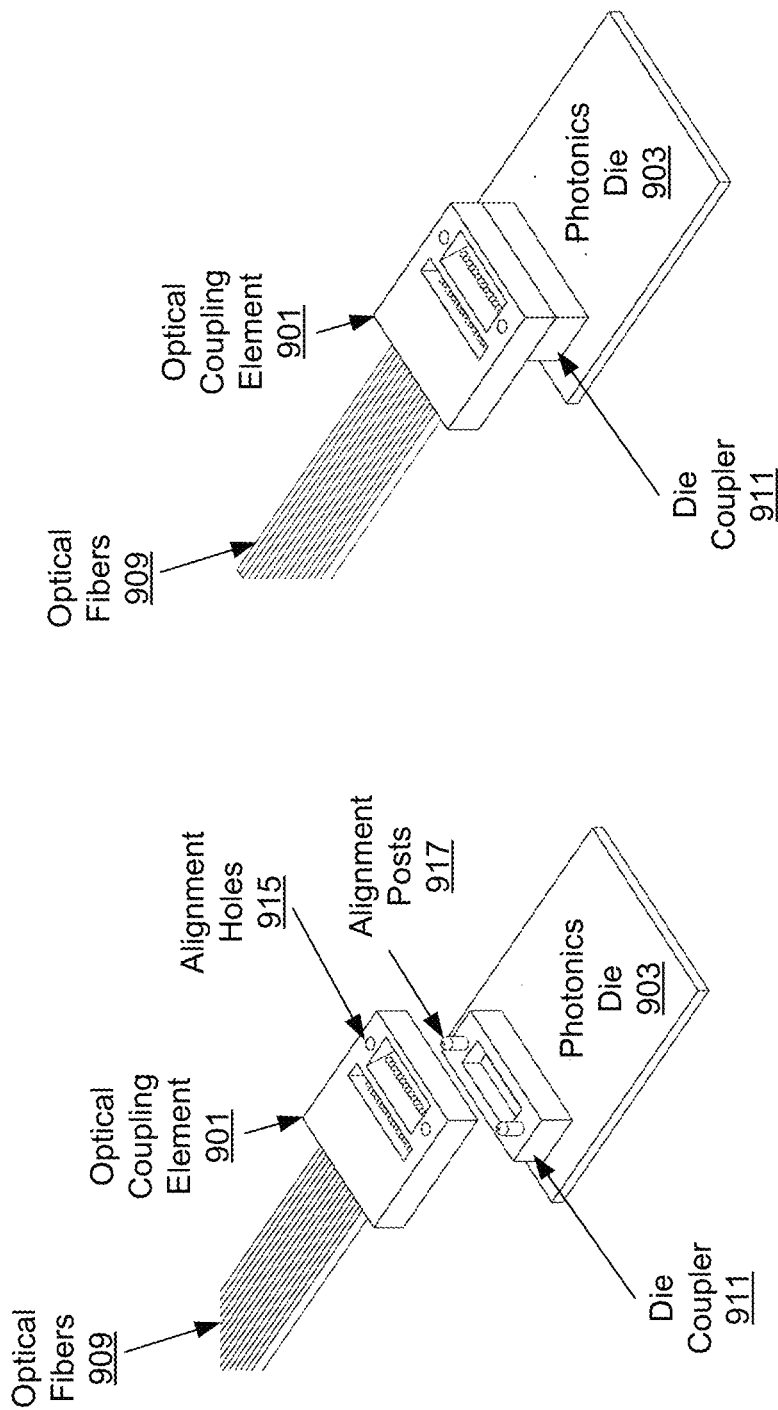

FIG. 9C illustrates the optical coupling element 901 before coupling to a lensed coupler 911 that is bonded to a photonics die 903. The photonics die 903 may be substantially similar to the photonics die described above, and may comprise grating couplers over which the die coupler 911 is bonded. The die coupler 911 may be substantially similar to the die coupler 811 described with respect to FIG. 8, and may provide a mechanical interconnect on the photonics die with alignment posts 917 to be inserted into the alignment holes 915 for accurate alignment of optical paths within the connectors as well as mechanical fixation of the connectors. Lenses within the die coupler 911 may direct optical signals to and from grating couplers in the photonics die 903.

FIG. 9D illustrates the optical coupling element 901 being mated to the die coupler 911, in a manner similar to the mated couplers 801 and 811 in FIG. 8. Once coupled, optical signals may be communicated between the optical fibers 909 and the photonics die 903 via the lenses 907 and grating couplers in the photonics die 903.

Figure 10A:
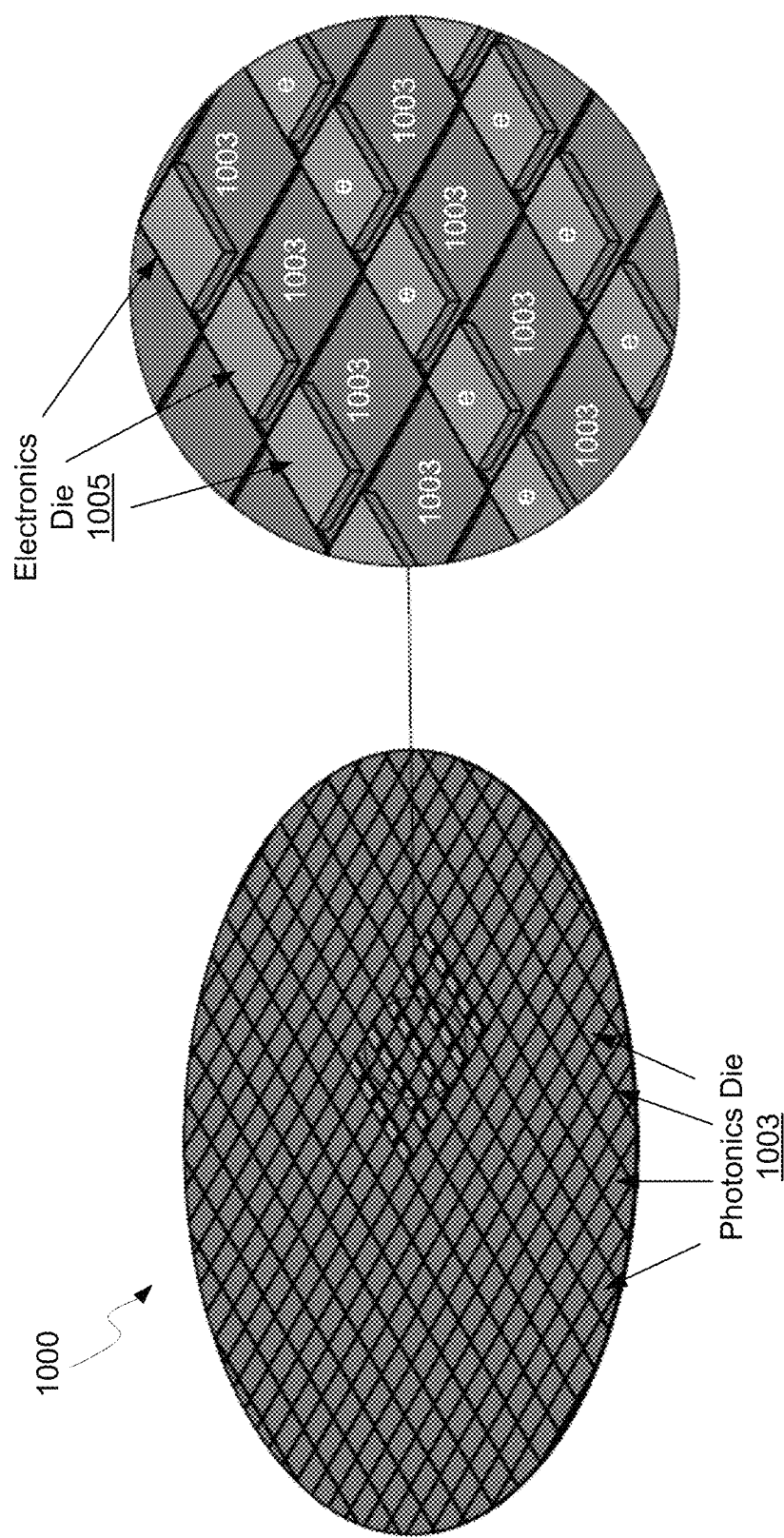
FIGS. 10A-10D illustrate wafer-level processing of silicon photonics die, in accordance with an example embodiment of the disclosure.
Figure 10B:
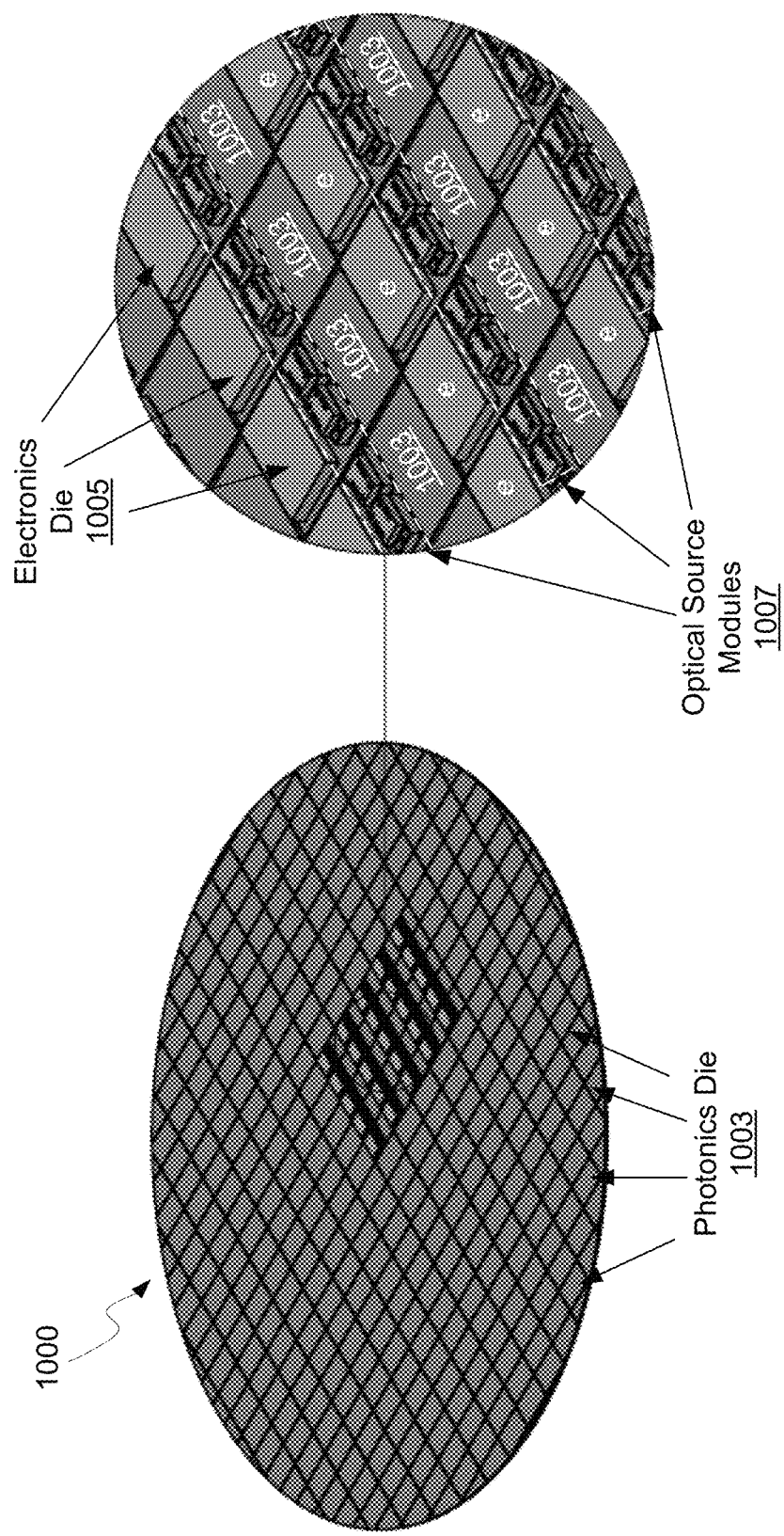
Figures 10C, 10D:
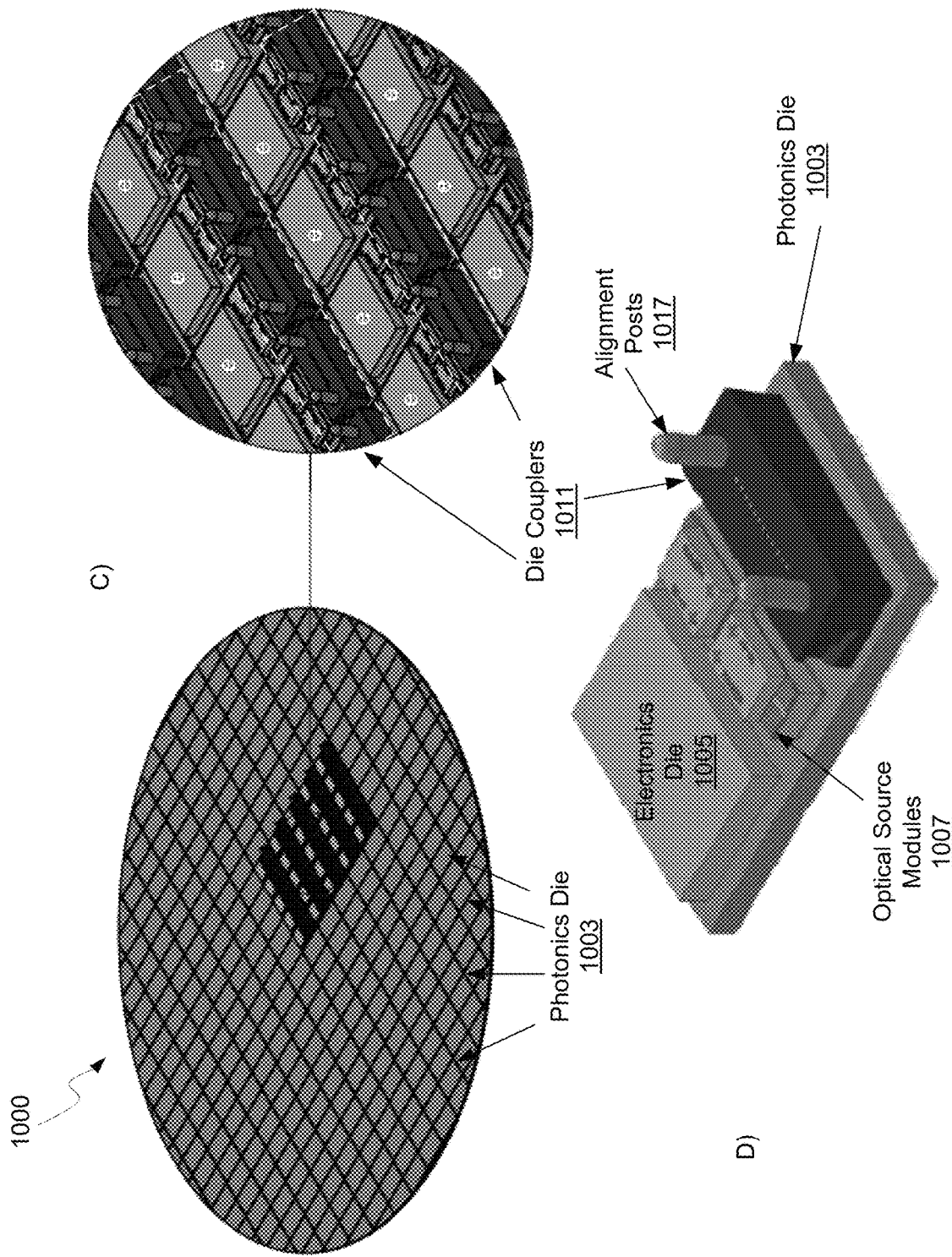

FIGS. 10A-10D illustrate wafer-level processing of silicon photonics die, in accordance with an example embodiment of the disclosure. Referring to FIG. 10A, there is shown a silicon photonics wafer 1000 comprising a plurality of photonics die 1003. The inset to the right shows a zoomed-in view of a subset of the photonics die 1003 to clearly show an electronics die 1005 bonded to the photonics die 1003, which are also labeled "e" in the inset.

Although a single electronics die 1005 is bonded to each photonics die 1003, other numbers of die may be bonded, depending on photonics and electronics die sizes and desired performance, for example. Wafer-level processing may enable simpler automated placement of the electronics die 1005 on the photonics die 1003. The electronics die 1005 may be bonded to the photonics die 1003 utilizing metal contacts, such as copper pillars, for example, although other contacts may be utilized.

FIG. 10B illustrates the silicon photonics wafer 1000 with bonded electronics die 1005 and optical source modules 1007, similar to the optical source modules 209 described with respect to FIG. 2. Accordingly, the optical source modules 1007 may comprise one or more lasers situated in the assembly to direct one or more optical signals, either directly or with a reflective surface, for example, into the photonics die 1003. The optical source modules may comprise silicon optical bench structures for supporting and providing electrical contact to the one or more lasers, and may comprise angled reflected surfaces for directing optical signals into the photonics die 1003.

As with the electronics die 1005, the optical source modules 1007 may be placed in a wafer-level automated pick-and-place process thereby providing accurate placement on the photonics die 1003. In addition, passive optical paths in the photonics die 1003 may terminate in a grating coupler that may be monitored such that the measured optical signal may be maximized when the optical source assemblies are aligned with input grating couplers.

FIG. 10C illustrates the silicon photonics wafer 1000 after placement of lensed couplers 1011 on the photonics die 1003. The die couplers 1011 may be similar to the die couplers 211, 311, 611, 811, 911 described with respect to FIGS. 2, 3, 6, 8 and 9. Accordingly, the die couplers 1011 may comprise lens or fiber stub arrays for coupling optical signals to and from the top surface of the photonics die 1003 and may comprise alignment posts 1017 for aligning the die couplers 1011 to a fiber coupler, such as the optical coupling elements 213, 313A, 313B, 413, 801, and 901.

FIG. 10D illustrates a completed transceiver package comprising the photonics die 1003 separated from the silicon photonics wafer 1000, and shows the bonded electronics die 1005, optical source modules 1007, and die coupler 1011. Because of the modular structure of the die couplers 1011 and optical coupling elements 213, 313A, 313B, 413, 801, and 901, wafer-level processing may be utilized up to at least this point in the manufacturing process because there are no unwieldy fibers or fiber bundles to be handled, greatly improving cycle times and yields.

Figure 11:
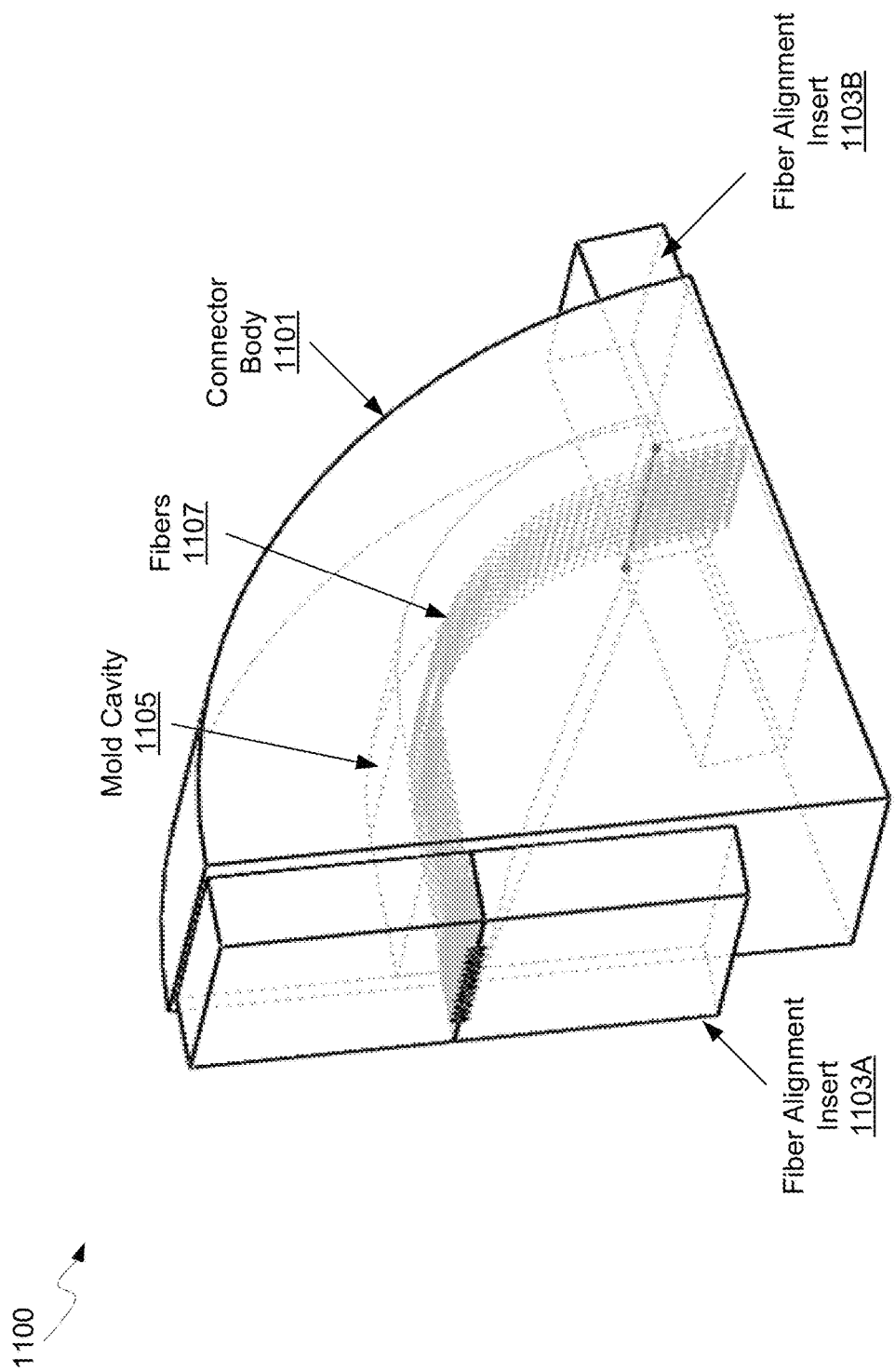
FIG. 11 is drawing illustrating an alternative fiber connector, in accordance with an example embodiment of the disclosure.

FIG. 11 is drawing illustrating an alternative fiber connector, in accordance with an example embodiment of the disclosure. Referring to FIG. 11, there is shown fiber connector 1100 comprising a connector body 1101, fiber alignment inserts 1103A and 1103B, a mold cavity 1105, and fibers 1107.

The fibers 1107 may be directly molded into the fiber connector 1100 where the ends of the fibers 1107 may be held in precision mold features, i.e., the fiber alignment inserts 1103A and 1103B. The connector body 1101 may comprise a molded connector body structure, where the fiber alignment inserts 1103A and 11038 may comprise precision holes, grooves, or other features for alignment at the entry and exit of the fiber connector 1100. For example, the fiber alignment insert 1103A may receive an external fiber bundle or ribbon, and may align the fibers to the fibers 1107 in the fiber connector 1100 without the need for high precision alignment techniques. In an example scenario, the fiber alignment inserts 1103A and 1103B may be molded concurrently with the connector body 1101.

The fiber connector 1100 may comprise an alternative single piece embodiment to the two piece connectors described above, with the remaining connection being from fibers inserted in to the fiber alignment insert 1103A.

Figure 12:
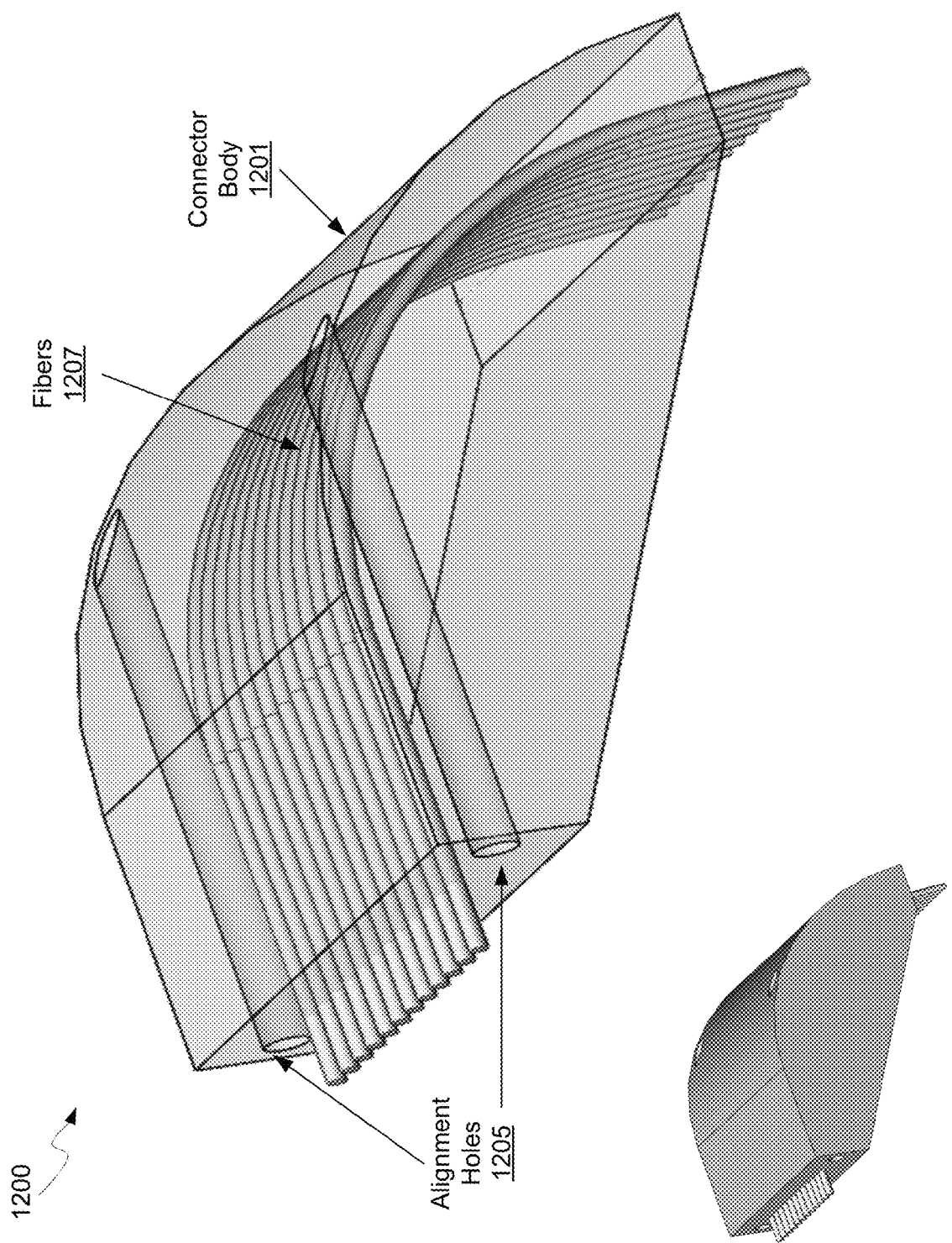
FIG. 12 illustrates an as-molded low-profile die connector, in accordance with an example embodiment of the disclosure.

FIG. 12 illustrates an as-molded low-profile die connector, in accordance with an example embodiment of the disclosure. Referring to FIG. 12, there is shown a fiber connector 1200 with a connector body 1201, alignment holes 1205, and fibers 1207. The fibers 1207 may protrude from the ends of the fiber connector 1200, and may be trimmed and polished as needed. The inset in the lower left of FIG. 12 shows a non-transparent view of the fiber connector 1200 with the fibers 1207 protruding out the ends.

In an embodiment of the disclosure, a method and system are disclosed for an optical coupler for silicon photonics devices and may include a photonics transceiver comprising a silicon photonics die, an electronics die, an optical source module, and a fiber connector, the fiber connector for receiving one or more optical fibers and comprising a die coupler and an optical coupling element. The die coupler may be bonded to a top surface of the photonics die and aligned above an array of grating couplers, where the optical coupling element may be removably attached to the die coupler and where the electronics die and the optical source module may be bonded to the top surface of the silicon photonics die.

One or more continuous wave (CW) optical signals may be received in the silicon photonics die from the optical source module and the one or more received CW optical signals may be processed based on electrical signals received from the electronics die. Modulated optical signals may be received in the silicon photonics die from one or more optical fibers coupled to the fiber connector. The optical coupling element may redirect the received modulated optical signals at a near right angle to the top surface of the photonics die. Electrical signals may be generated in the silicon photonics die based on the received modulated optical signals.

The generated electrical signals may be communicated to the electronics die. The modulated optical signals may be received via grating couplers in the top surface of the photonics die. The optical coupling element may comprise an array of lenses, one or more guide holes for receiving the one or more optical fibers, a prism reflector and/or an array of optical fibers bent at a near right angle. The array of optical fibers in the optical coupling element may comprise multi-core fibers. The die coupler may comprise an array of fiber stubs, and/or an array of lenses. The one or more optical fibers may comprise multi-core fibers.

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for communication, the method comprising:
in a photonics transceiver comprising a silicon photonics die, an optical source module coupled to a top surface of the silicon photonics die, and a fiber connector, the fiber connector for receiving one or more optical fibers and comprising a die coupler and an optical coupling element comprising optical fibers, wherein the die coupler comprises:
    a rectangular coupling structure with a bottom surface bonded to the top surface of the silicon photonics die;
    posts on a top surface of the rectangular coupling structure for alignment with the fiber connector when the fiber connector is operably coupled to the silicon photonics die; and
    optical fibers for coupling optical signals between the silicon photonics die and the one or more optical fibers in the fiber connector, wherein the die coupler is aligned above an array of grating couplers in the silicon photonics die and is within the optical coupling element, and wherein a bottom surface of the optical coupling element is also bonded to the top surface of the silicon photonics die:
    receiving one or more continuous wave (CW) optical signals in the silicon photonics die from the optical source module;
    receiving modulated optical signals in the silicon photonics die from one or more optical fibers coupled to the fiber connector;
    redirecting, in the optical coupling element, the received modulated optical signals at a near right angle to the top surface of the photonics die through the die coupler which couples the optical signals in only a vertical direction from the optical coupling element to the silicon photonics die; and
    generating electrical signals in the silicon photonics die based on the received modulated optical signals.

2. The method according to claim 1, comprising receiving the modulated optical signals via grating couplers in the top surface of the photonics die.

3. The method according to claim 1, wherein the optical coupling element comprises an array of lenses.

4. The method according to claim 1, wherein the optical coupling element comprises one or more guide holes for receiving the one or more optical fibers.

5. The method according to claim 1, wherein the optical coupling element comprises a prism reflector.

6. The method according to claim 1, wherein the optical fibers in the optical coupling element are bent at a near right angle.

7. The method according to claim 1, wherein the array of optical fibers in the optical coupling element comprise multi-core fibers.

8. The method according to claim 1, wherein the die coupler comprises an array of fiber stubs.

9. The method according to claim 1, wherein the die coupler comprises an array of lenses.

10. The method according to claim 1, wherein the one or more optical fibers comprise multi-core fibers.

11. The method according to claim 8, wherein the die coupler comprises substantially straight optical fiber-stubs that are directly molded into a matrix material.

12. The method according to claim 1, wherein the optical coupling element comprises substantially curved optical fiber-stubs that are directly molded into a matrix material.

13. A system for communication, the system comprising:
a photonics transceiver comprising a silicon photonics die, an optical source module couple to a top surface of the silicon photonics die, and a fiber connector, the fiber connector for receiving one or more optical fibers and comprising a die coupler and an optical coupling element comprising optical fibers, wherein the die coupler comprises:
    a rectangular coupling structure with a bottom surface bonded to the top surface of the silicon photonics die;
    posts on a top surface of the rectangular coupling structure for alignment with the fiber connector when the fiber connector is operably coupled to the silicon photonics die; and
    optical fibers for coupling optical signals between the silicon photonics die and the one or more optical fibers in the fiber connector, wherein the die coupler is aligned above an array of grating couplers in the silicon photonics die and is within the optical coupling element, and wherein a bottom surface of the optical coupling element is also bonded to the top surface of the silicon photonics die, said photonics transceiver being operable to:
    receive one or more continuous wave (CW) optical signals in the silicon photonics die from the optical source module;
    receive modulated optical signals in the silicon photonics die from one or more optical fibers coupled to the fiber connector;
    redirect, in the optical coupling element, the received modulated optical signals at a near right angle to the top surface of the photonics die through the die coupler which couples the optical signals in only a vertical direction from the optical coupling element to the silicon photonics die; and
    generate electrical signals in the silicon photonics die based on the received modulated optical signals.

14. The system according to claim 13, wherein said photonics transceiver is operable to receive the modulated optical signals via grating couplers in the top surface of the photonics die.

15. The system according to claim 13, wherein the optical coupling element comprises an array of lenses.

16. The system according to claim 13, wherein the optical coupling element comprises one or more guide holes for receiving the one or more optical fibers.

17. The system according to claim 13, wherein the optical coupling element comprises a prism reflector.

18. The system according to claim 13, wherein the optical fibers in the optical coupling element are bent at a near right angle.

19. The system according to claim 13, wherein the array of optical fibers in the optical coupling element comprise multi-core fibers.

20. The system according to claim 13, wherein the die coupler comprises an array of fiber stubs.

21. The system according to claim 13, wherein the die coupler comprises an array of lenses.

22. The system according to claim 13, wherein the die coupler comprises substantially straight optical fiber-stubs that are directly molded into a matrix material.

23. The system according to claim 13, wherein the optical coupling element comprises substantially curved optical fiber-stubs that are directly molded into a matrix material.

24. A method for manufacturing an optoelectronic device, the method comprising:
bonding silicon complementary metal-oxide semiconductor (CMOS) electronics die on photonics die in a silicon wafer;
bonding optical source modules to a top surface of the photonics die;
bonding die couplers to the top surface of the photonics die, said die couplers aligned to an array of grating couplers in the photonics die and being operable to receive an optical coupling element comprising optical fibers, said optical coupling element being operable to couple optical signals from one or more optical fibers external to said optical coupling elements and to couple optical signals in a vertical direction from the optical coupling element to the photonics die using said optical fibers in said optical coupling element, wherein the die couplers comprise:
a rectangular coupling structure with a bottom surface bonded to the top surface of the photonics die;
posts on a top surface of the rectangular coupling structure for alignment with the fiber connector when the fiber connector is operably coupled to the photonics die; and
optical fibers for coupling optical signals between the silicon photonics die and the one or more optical fibers in the fiber connector when coupled to the photonics die; and
dicing the silicon wafer to form individual transceiver packages each comprising a photonics die, an optical source module, and a die coupler.

25. A system for communication, the system comprising:
a photonics transceiver comprising a silicon photonics die, an optical source module coupled to a top surface of the silicon photonics die, and a fiber connector comprising an optical coupling element and a die coupler, the fiber connector for receiving one or more optical fibers, wherein the die coupler comprises:
a rectangular single molded piece with embedded optical fibers and a bottom surface bonded to the top surface of the silicon photonics die; and
posts on a top surface of the rectangular coupling structure for alignment with the fiber connector when the fiber connector is operably coupled to the photonics die, wherein said die coupler is aligned above an array of grating couplers in the silicon photonics die and is within the optical coupling element, and wherein a bottom surface of the optical coupling element is also coupled to the top surface of the silicon photonics die, said photonics transceiver being operable to:
receive one or more continuous wave (CW) optical signals in the silicon photonics die from the optical source module;
receive modulated optical signals in the silicon photonics die from one or more optical fibers coupled to the fiber connector;
redirect, in the optical coupling element, the received modulated optical signals at a near right angle to the top surface of the photonics die through the die coupler which couples the optical signals in a vertical direction only from the optical coupling element to the silicon photonics die; and
generate electrical signals in the silicon photonics die based on the received modulated optical signals.

* * * * *